United States Patent [19]
Mellor

[11] 3,885,837
[45] May 27, 1975

[54] LINEAR BEARING HAVING REPLACEABLE INSERT

[76] Inventor: Harrison Clay Mellor, 194 Providence Rd., Newtown Square, Pa. 19144

[22] Filed: May 29, 1973

[21] Appl. No.: 364,312

[52] U.S. Cl. .................. 308/3 R; 308/3 A; 308/6 R
[51] Int. Cl. ............................................ F16c 17/00
[58] Field of Search .................... 308/3 A, 3 R, 6 R

[56] References Cited
UNITED STATES PATENTS

| | | | |
|---|---|---|---|
| 2,719,761 | 10/1955 | Bonnate | 308/3 A |
| 3,032,377 | 5/1962 | Blase | 308/3 R |
| 3,054,645 | 9/1962 | Evans | 308/3 A |
| 3,106,117 | 10/1963 | Duquesnel | 308/3 A |

FOREIGN PATENTS OR APPLICATIONS

| | | | |
|---|---|---|---|
| 325,439 | 9/1920 | Germany | 308/3 A |

Primary Examiner—Charles J. Myhre
Assistant Examiner—R. H. Lanaus
Attorney, Agent, or Firm—Howson & Howson

[57] ABSTRACT

A conveyor comprising an elongated cable and a pair of rails extending alongside the cable for guiding articles which are supported on the cable as it advances lengthwise is provided with an improved linear bearing which slidably receives the cable to guide and support the same. The bearing includes a base element having an elongated slot within which is mounted an insert having an elongated groove which slidably receives the cable. The insert is of a low-friction, wear-resistant material such as polyethylene having an ultra high molecular weight. The base element is fabricated from a relatively rigid plastic material such as ABS or PVC. The insert has a pair of flexible sidewalls which are shouldered at their upper ends to cooperate with ledges extending into the slot in the base element for retaining the insert within the slot. The sidewalls have tapered surfaces which permit the insert to be forced downwardly and snapped into position within the slot in the base element.

6 Claims, 6 Drawing Figures

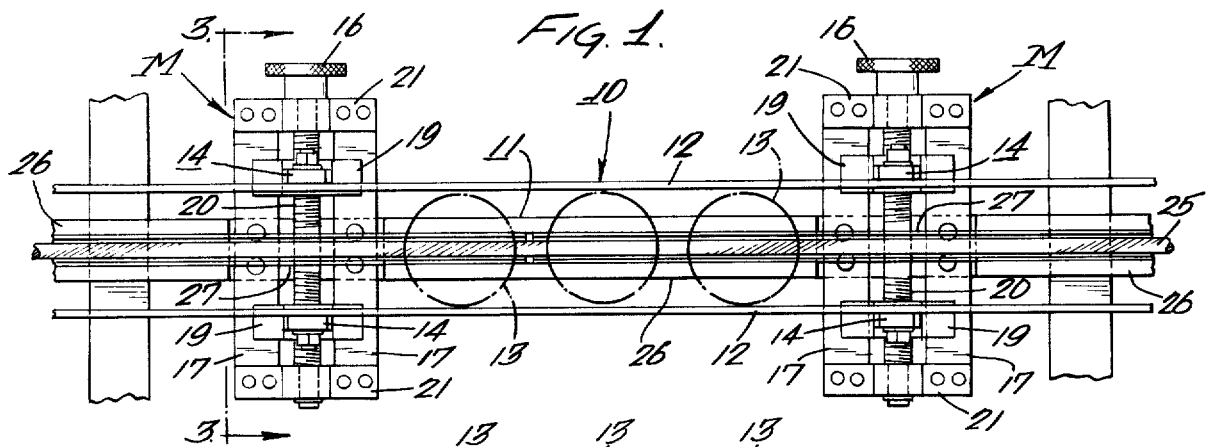
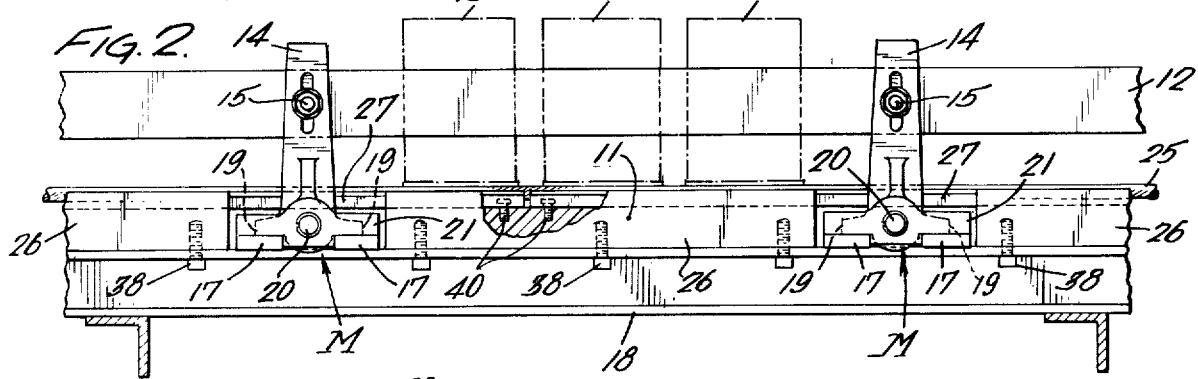
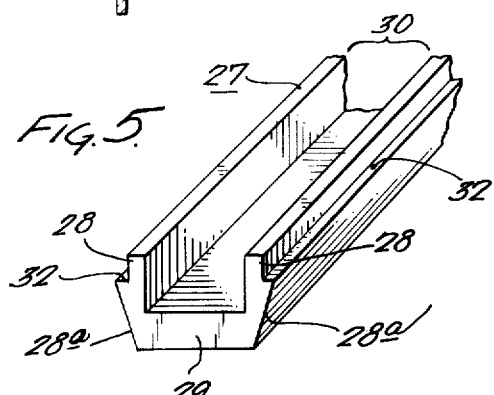
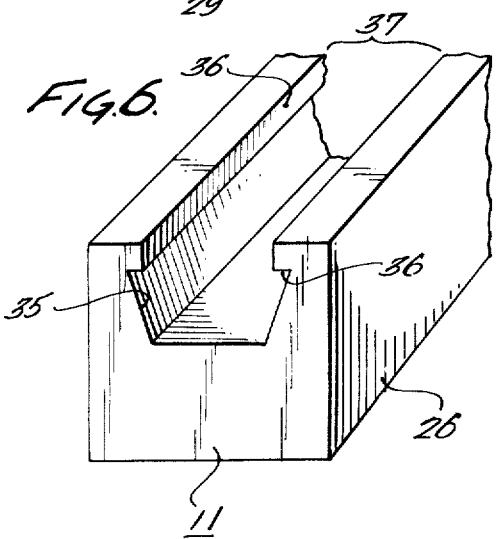
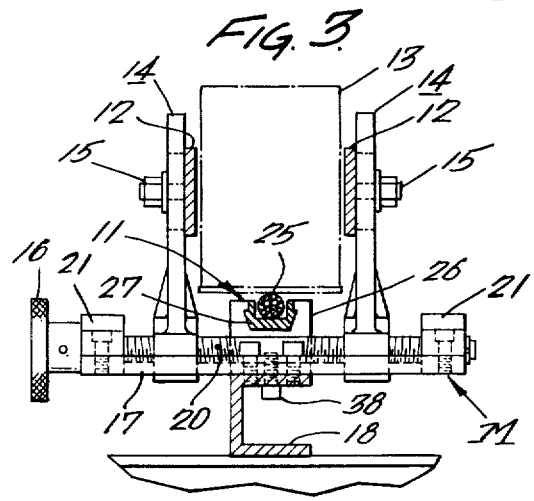
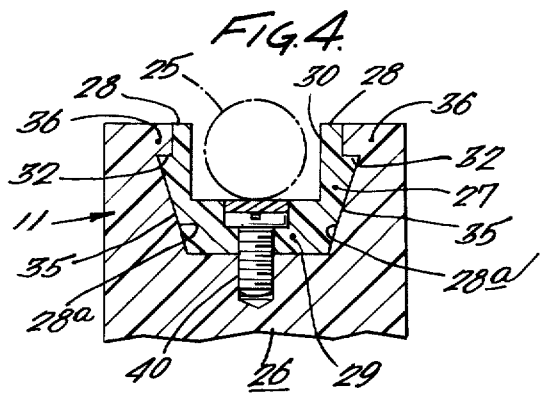

LINEAR BEARING HAVING REPLACEABLE INSERT

The present invention relates to conveyors, and more particularly, the present invention relates to a conveyor wherein a series of articles are supported on a cable and guided between siderails as the cable advances longitudinally.

Cable conveyors have been employed to move articles of generally uniform size and shape from one location to another. For instance, such a conveyor may be utilized to convey either filled or empty containers from one location to another in a food processing plant. An example of such a cable conveyor is disclosed in U.S. Pat. No. 3,507,380.

In the aforementioned patent, the cable is guided longitudinally in a linear bearing defined by a slot extending lengthwise in an elongated block of wood. The wood is impregnated with a lubricant to reduce sliding friction between the cable and the block, and a lubricant is contained in the slot. A lubricant-impregnated wood sold by the Arguto Oilless Bearing Company of Philadelphia under the trademark ARGUTO has been found to function satisfactorily.

Although the lubricant-impregnated wooden bearing disclosed in the above-noted patent may perform well, it possesses certain limitations. For instance, the bearing is normally fabricated from a series of relatively long lengths of wood in which the elongated slots are cut. The lengths are disposed in endwise abutting relation, and they are supported along their lengths by an underlying structural member, such as a channel member. Mechanisms for adjusting the spacing between the siderails are mounted on the channel at spaced locations along its length, and at the locations where the adjusting mechanisms traverse the channel, the bearing must be notched when it is installed. Such notching must be performed skillfully in order to prevent the bearing from being split or otherwise damaged. As a result, a conveyor having the above-noted wooden bearing requires skilled labor and a considerable amount of a craftsman's time to install and/or replace. Accordingly, it should be apparent that a conveyor constructed according to the teachings of the above-noted patent is not as inexpensive to fabricate and maintain as desired.

In addition to the above limitations, the prior art bearing structure possesses certain other limitations. For example, although the lubricant-impregnated wood has good wear characteristics, there are environments and service conditions which can cause the bearing to wear sufficiently as to require replacement. In order to replace the bearing structure, an entire section must be dismounted from the channel support and a completely new bearing section installed. This procedure requires a significant amount of labor, and it also increases the downtime of the conveyor. Moreover, it is economically undesirable for an entire section of the bearing to be replaced when only a small portion of its length may have become worn.

Sanitary standards for handling food products are being increased by various governmental regulatory agencies. As a result, wood and impregnated wood bearings are being excluded from environments in which food products are being handled. However, a bearing fabricated from a plastic and/or plastic metal combination material would be highly desirable and acceptable in food processing environments. Furthermore, since cable conveyors tend to generate noise in operation, a linear bearing which minimizes such noise is desirable.

With the foregoing in mind, it is a primary object of the present invention to provide an improved linear bearing for use in a cable conveyor system.

It is another object of the present invention to provide a novel linear bearing which enables economies to be effected in the installation and maintenance of a cable conveyor system.

As another object, the present invention provides a unique linear bearing having a low-friction insert providing a cable support for a cable conveyor, the bearing being designed to afford replacement with a minimum of skilled labor and downtime of the conveyor.

As a further object, the present invention provides a linear bearing which has good wear qualities and which is capable of being fabricated by relatively inexpensive mass production techniques.

It is a still further object of the present invention to provide a linear bearing which minimizes the generation of noise when employed in a cable conveyor system.

More specifically, the present invention provides a linear bearing which is particularly suited for use in a cable conveyor system in which a pair of spaced siderails guide a series of articles in a predetermined path when the articles are supported on an elongated cable which advances lengthwise between the siderails. The bearing comprises a base element having an elongated slot which mounts an insert having a bottomwall and a pair of spaced sidewalls defining a cable-receiving elongated groove. The insert is retained within the slot by a pair of ledges which extend into the slot on the base element and which interengage shoulders on the sidewalls of the insert. The sidewalls are flexible and have outer surfaces which taper downwardly and toward one another to permit the insert to be forced into the slot and snapped into operating relationship therein. The insert is fabricated from a low-friction, wear-resistant material, such as ultra high molecular weight polyethylene, and the base element is fabricated from a rigid material which has good tensile and impact strengths and which is approved for food contact by governmental authorities such as aluminum or ABS or PVC plastic. The present invention provides a low cost linear bearing which has good wear characteristics and which is economical to install and replace.

These and other objects, features and advantages of the present invention should become apparent from the following description when taken in conjunction with the accompanying drawing, in which:

FIG. 1 is a plan view of a portion of a cable conveyor system which incorporates a linear bearing embodying the present invention;

FIG. 2 is a side elevational view of the conveyor system illustrated in FIG. 1;

FIG. 3 is a sectional view taken along line 3—3 of FIG. 1 to illustrate a cable which is disposed within the linear bearing of the present invention and which supports a container for movement therewith;

FIG. 4 is a greatly enlarged sectional view of the linear bearing of the present invention;

FIG. 5 is a full-size perspective view of a replaceable insert having a lengthwise-extending groove which slidably receives the cable; and FIG. 6 is a full-size perspective view of a base element which has an elongated slot within which the insert of FIG. 5 is mounted.

Referring now to the drawing, there is illustrated in FIG. 1 a conventional cable conveyor system 10 having a linear bearing 11 which embodies the present invention. In the conventional conveyor, a pair of siderails 12,12 extend along opposite sides of the bearing 11 for guiding a series of articles such as containers 13,13 along a predetermined path which, in the present instance, is straight. As best seen in FIG. 2, the siderails 12,12 are mounted on upstanding posts 14,14 which are located outboard of the rails 12,12. It is noted that the spacing of the siderails 12,12 above the elevation of the bearing 11 may be adjusted by the slotted connections 15,15 provided between the siderails 12,12 and the upstanding posts 14,14.

In order to vary the lateral spacing between the siderails 12,12 so that the conveyor 10 is capable of accommodating containers 13,13 of various sizes, the posts 14,14 are mounted for adjustment toward or away from one another by a mechanism M having a single operator 16. As may be seen in FIG. 1, the adjusting mechanism M is provided by a pair of ways 17,17 which are fastened in spaced relation transversely to a channel member 18 which extends lengthwise of the conveyor 10 and which supports the bearing 11. The lower portion of each post 14 has a pair of flanges 19,19 which extend outwardly in opposite directions and which engage the ways 17,17, and the lower portion of each post 14 threadedly receives a jackscrew 20 which extends between the ways 17,17. The ends of the jackscrew 20 are journalled in bearing blocks 21,21 which are mounted at opposite ends of the ways 17,17. The knurled operator 16 is securely fastened to the jackscrew 20 and operates to cause the posts 14,14 to move toward or away from one another when the operator 16 is rotated in one direction or the other. With this structure, the spacing between the siderails 12,12 may be readily adjusted.

In order to advance the containers 13,13, a cable 25 (FIG. 3) frictionally engages their bottoms midway between the siderails 12,12. The cable extends lengthwise of the conveyor 10 in the bearing 11, and the cable 25 is driven by a conventional drive mechanism (not shown) so that when it advances lengthwise, the containers 13,13 advance between the siderails 12,12. Preferably, the cable is coated with nylon. For a more detailed description of a desirable cable structure, reference is made to the aforementioned U.S. patent.

In accordance with the present invention, the bearing 11 is designed to provide a readily replaceable low-friction, wear-resistant support and guide for the cable 25. To this end, the bearing 11 (FIG. 4) comprises a base element 26 and an insert 27 carried by the base element 26. In the present instance, the insert 27 has a pair of spaced sidewalls 28,28 and a bottomwall 29 which cooperate to define an upwardly-open groove 30 therebetween. The sidewalls 28,28 have outer surfaces 28a, 28a which taper downwardly and toward one another, and each sidewall 28 has a notch adjacent its upper end providing a shoulder 32 which extends lengthwise of the insert 27. The depth of the groove 30 is less than the diameter of the cable 25 so that the cable 25 projects a slight distance upwardly beyond the bearing 11.

As best seen in FIG. 6, the base element 26 is supported along its length by means of a structural member such as the channel element 18, and the base element 26 is fastened to the channel element by a series of threaded fasteners 38,38. The base element 26 has a slot 35 with a shape similar to the shape of the insert 27, except that the base element 26 has a pair of ledges 36,36 which extend inwardly along the upper portion of the slot 35 and which terminate in spaced relation to provide a gap 37 permitting passage of the insert 27 downwardly. Preferably, the sidewalls 28,28 of the insert 27 are flexible in a transverse direction so that the insert 27 may be forced downwardly into the slot 35 to cause the surfaces 28a, 28a to cam the sidewalls 28,28 toward one another until the shoulders 32,32 register with the ledges 36,36, whereby the shoulders 32,32 interengage the ledges 36,36 to retain the insert 27 in the slot 35. Of course, the insert 27 may be slid endwise into the slot 35, as long as the end of the base element 26 is accessible.

In order to prevent the insert 27 from sliding lengthwise relative to the base element 26, fastening means in the form of a machine screw 40 (FIG. 4) may be employed. Preferably, the base element 26 is drilled and tapped at the downstream end of the bearing (as determined by the direction of movement of the cable) and the insert 27 is countersunk to receive the head of the screw 40. The head of the screw 40 is desirably covered by a plug of insert material to provide a continuous sliding surface. To avoid any possibility of cable to metal contact, in the event of insert wear, the screw (40) may be fabricated entirely of insert material. This mounting mechanism permits relatively minor movements of the insert and the base element such as may occur due to differences in thermal expansion of the two materials while preventing the insert from sliding out of the base element.

In the present invention, the insert 27 is preferably extruded or machined from a low-friction plastic material which is resistant to wear such as ultra high molecular weight polyethylene (UHMW) P/E or other low-friction, long wearing extrudable plastic materials such as nylon. Such insert material is particularly desirable because it creates a minimum of friction when utilized in conjunction with a nylon coated steel cable. The base element 26 may also be either extruded or machined from a relatively rigid material which is different from the low-friction material of the insert 27. The base element 26 may be fabricated from a metal such as aluminum or a plastic material such as acrylonitril butadiene styrene (ABS) or polyvinyl chloride (PVC). These materials are desirable because they provide good tensile and impact strengths, and they are approved for food contact by the U.S. Food & Drug Administration. In addition, such materials possess low moisture absorption characteristics. An example of a desirable plastic material for the base element 26 is sold by the Marbon Division of Borg-Warner under the trade designation Cycolac ABS. Similarly, an example of a desirable plastic material from which the insert 27 may be fabricated is sold under the trade designation Hifax 1900 by Hercules, Inc. Other suitable alternative materials for the insert 27 would be Hostalen GUR sold by American Hoecht Co., and for the base element 26, suitable alternate materials may include Dural sold by Alpha Chemical and Plastics Corp.

The two-piece bearing structure of the present invention provides a number of significant advantages. For instance, as best seen in FIG. 2, the base element 26 may be manufactured in predetermined lengths which correspond to the spacing between the adjusting mechanisms M,M. The inserts 27 may be manufactured in various other lengths, and/or the same lengths as the base elements 26 and installed so that the insert 27 spans across the gap between the ends of adjacent sections of the base elements 26,26 which terminate on opposite sides of the adjusting mechanisms M,M. This structure renders it unnecessary for the bearing 11 to be notched at spaced locations during installation. Moreover, it is noted that the insert 27 may be readily removed and replaced in the event that it should become worn after prolonged usage. Such removal and replacement may be effected with a minimum of skilled labor and downtime for the conveyor system.

Although the illustrated embodiment has been described with reference to a straight line cable conveyor, it should be apparent that the insert 27, as well as the bearing element 26, may be fabricated in various curved configurations and/or utilized in conjunction with other conveyor elements such as chains and the like. Furthermore, the size and shape of the insert 27 and its base element 26 may be varied to suit the particular requirements of the conveyor system in which the bearing 11 is to be installed. The bearing 11 is economical to manufacture because the base element 26 may be fabricated from a material which is less expensive than the low-friction, wear-resistant material of the insert 27. Also, since the bearing 11 is fabricated of plastic materials, it may be employed in a broader range of environments, including those in which cleanliness and noise abatement are important considerations.

Thus, in view of the foregoing, it should be apparent that an improved linear bearing has now been provided for use in cable conveyor systems.

While a preferred embodiment of the present invention has been described in detail, various modifications, alterations and changes may be made without departing from the spirit and scope of the present invention as defined in the appended claims.

I claim:

1. A linear bearing comprising: a base element having an elongated slot, an insert mounted within said slot, said insert being fabricated from a low-friction material and said base element being fabricated from a rigid material different from said base element material, said insert having a bottom wall and a pair of spaced upright sidewalls defining therebetween an upwardly-open groove, said sidewalls being flexible in a direction transverse to said slot and having smooth outer surfaces tapering inwardly toward one another in a downward direction, interengaging means on said base element and said insert for releasably retaining said insert in said slot, said interengaging means including a pair of inwardly extending ledges on said base element and a complementary pair of notches extending along the upper margins of the tapered sidewall surfaces coextensive in length with the insert, said base element ledges extending into said slot and terminating in spaced relation for cooperating with said tapered sidewall surfaces to flex said sidewalls inwardly when said insert is displaced downwardly into said slot, said ledges overlying the shoulders to secure the insert to the base element when the insert is mounted in the slot with the ledges of the base element received in the notches of the insert, whereby the insert is capable of expanding and contracting relative to the base element while being capable of being readily removed and replaced.

2. Apparatus according to claim 1 wherein said insert is of ultra high molecular weight polyethylene material.

3. Apparatus according to claim 1 wherein said base element is of a plastic material.

4. Apparatus according to claim 3 wherein said plastic is ABS plastic.

5. Apparatus according to claim 3 wherein said plastic is PVC plastic.

6. Apparatus according to claim 1 wherein said base element is of metal.

* * * * *